Figure 1:
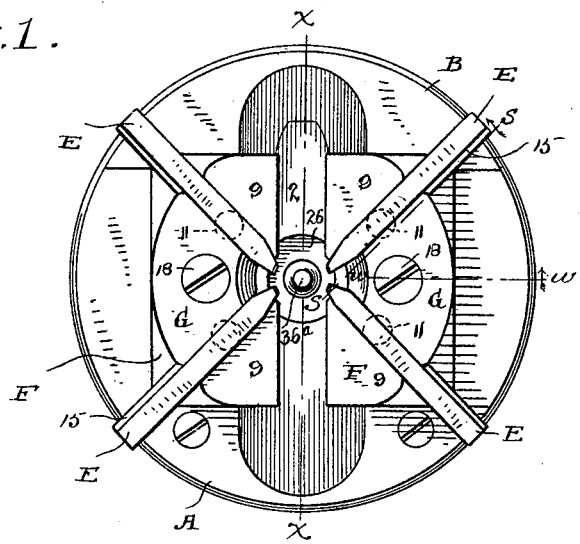

No. 630,712. Patented Aug. 8, 1899.
C. A. JOHNSON.
TOOL FOR CUTTING SCREW THREADS.
(Application filed Sept. 12, 1898.)
(No Model.) 3 Sheets—Sheet 1.

WITNESSES
H. A. Lamb
A. M. Witherell

INVENTOR
Charles A. Johnson
By A. M. Wooster
Atty

No. 630,712. Patented Aug. 8, 1899.
C. A. JOHNSON.
TOOL FOR CUTTING SCREW THREADS.
(Application filed Sept. 12, 1898.)
(No Model.) 3 Sheets—Sheet 2.
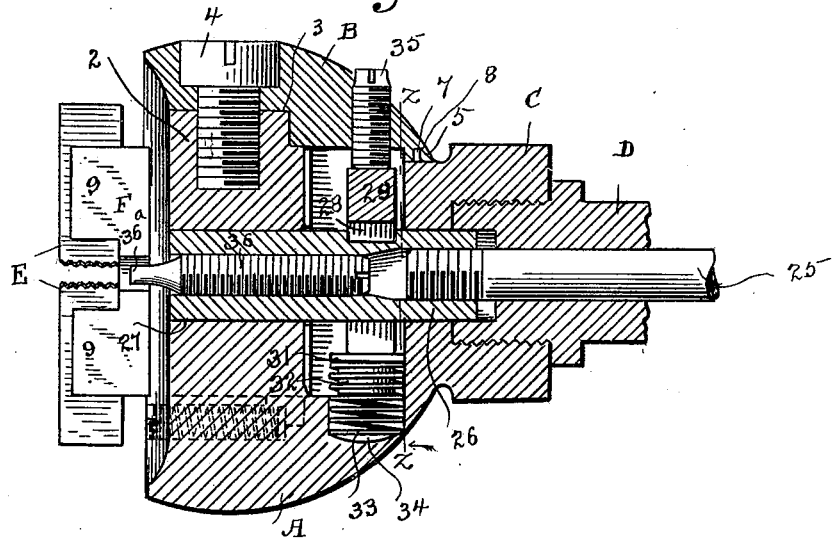
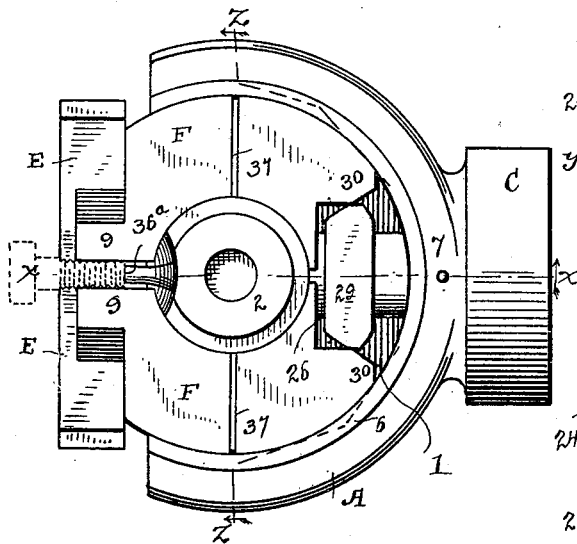
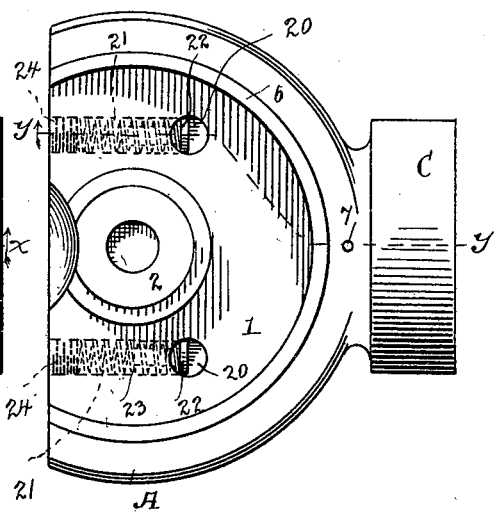
WITNESSES
H. A. Lamb
A. M. Witherell
INVENTOR
Charles A. Johnson
By A. M. Wooster
Atty.

No. 630,712. Patented Aug. 8, 1899.
C. A. JOHNSON.
TOOL FOR CUTTING SCREW THREADS.
(Application filed Sept. 12, 1898.)
(No Model.) 3 Sheets—Sheet 3.

WITNESSES
H. A. Lawly
T. W. Witherell

INVENTOR
Charles A. Johnson
By A. M. Wooster Atty

UNITED STATES PATENT OFFICE.

CHARLES A. JOHNSON, OF UNIONVILLE, CONNECTICUT.

TOOL FOR CUTTING SCREW-THREADS.

SPECIFICATION forming part of Letters Patent No. 630,712, dated August 8, 1899.

Application filed September 12, 1898. Serial No. 690,712. (No model.)

*To all whom it may concern:*

Be it known that I, CHARLES A. JOHNSON, a citizen of the United States, residing at Unionville, county of Hartford, State of Connecticut, have invented a new and useful Tool for Cutting Threads, of which the following is a specification.

My invention has for its object to produce a tool adapted for general use in cutting threads upon bolts, screws, and rods which shall be simple and inexpensive to produce, durable, which shall be adapted for use in an automatic machine where high speed is required, in which use it can be made to thread from twenty-five hundred to three thousand bolts per hour, and which shall be equally adapted for use as a hand-tool—as, for example, in a turret-lathe.

With these ends in view I have devised the novel thread-cutting tool of which the following description, in connection with the accompanying drawings, is a specification, reference characters being used to designate the several parts.

Figure 2:
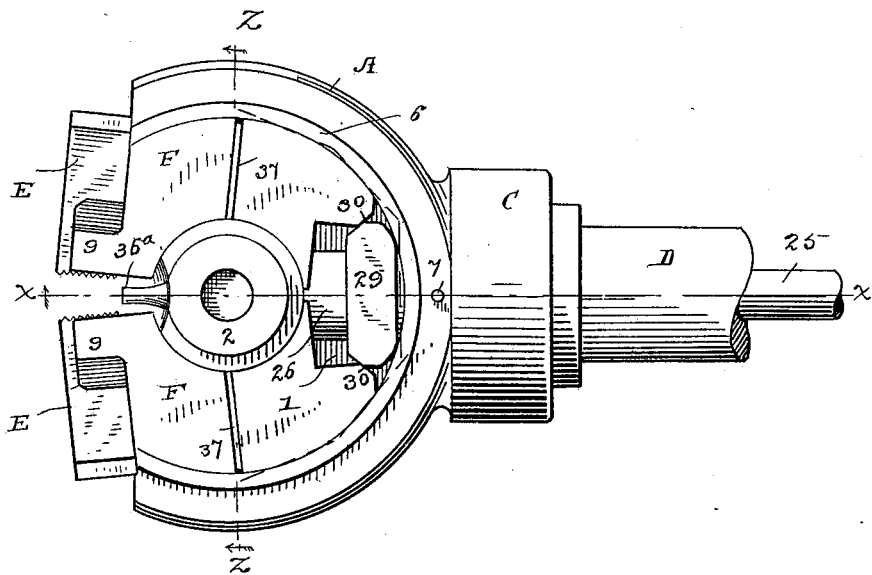
Figure 8:
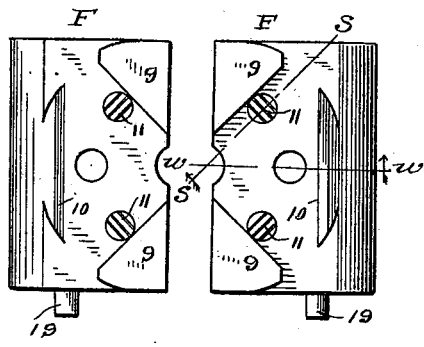
Figure 10:
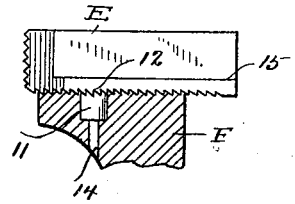
Figure 9:
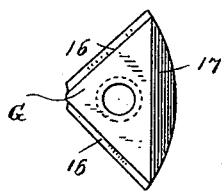
Figure 11:
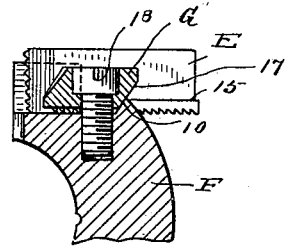
Figure 7:
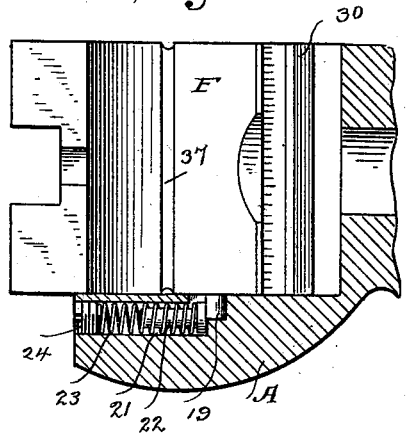
Figure 6:
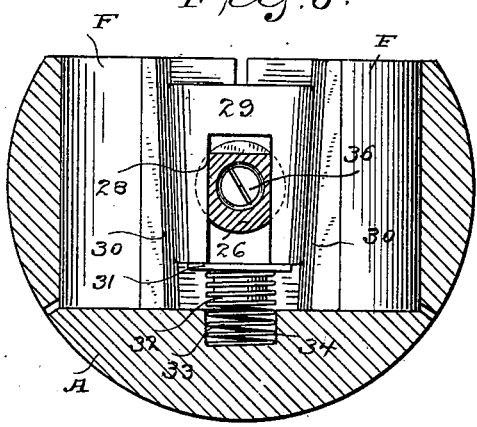

Figure 1 is a front elevation, the carriers and cutters being in the open position; Fig. 2, a plan view corresponding therewith, the top plate being removed; Fig. 3, a section on the line $x\,x$ in Figs. 1 and 2; Fig. 4, a plan view similar to Fig. 2, with the exception that the carriers and cutters are in the closed position, a bolt that is being operated upon being indicated by dotted lines; Fig. 5, a plan view of the body with the carriers removed; Fig. 6, a section on the line $z\,z$ in Figs. 2 and 4 and partially on the same line in Fig. 3; Fig. 7, a section of the casing on the line $y\,y$ in Fig. 5, one of the carriers without cutters appearing in elevation; Fig. 8, an elevation of the carriers without cutters detached; Fig. 9, an inverted plan view of one of the cutter-locking blocks, detached; Fig. 10, a sectional view of one of the carriers on the line $s\,s$ in Figs. 1 and 8, showing the way in which the cutters are held against backward movement; and Fig. 11 is a section of one of the carriers on the line $w\,w$ in Fig. 8, showing the way in which the cutters are clamped to the carriers.

A denotes the body, which may be of any preferred form, although where the tool is to rotate I preferably make it spherical; B, the top plate, and C an internally-threaded hub upon the body, by means of which the tool may be attached to a sleeve D. In practice, if preferred, the body and sleeve D may be formed in a single piece. Within the body is a circular recess 1. The exact extent of this recess is not of the essence of my invention; but I have shown it as greater than a half-circle.

2 denotes a fixed stud which extends upward from the bottom of recess 1 and above the top of said recess, top plate B being provided with a socket 3 to receive the upper end of the stud and being secured to the body by a bolt 4, which passes through the top plate and engages a threaded opening in the upper end of the stud. At the edge of the top plate, on the under side, is a flange 5, (see Fig. 3,) which fits closely over and incloses a flange 6 on the top of the body.

7 denotes a pin extending upward from the body which is adapted to engage an opening 8 in the top plate to cause the top plate and body to register.

E denotes the thread-cutters, which are carried by oscillating carriers F. These carriers are so shaped as to occupy the space between stud 2 and the wall of the recess and oscillate freely in said recess. Upon the face of each carrier are two blocks 9, the inner faces of said blocks extending from the inner sides of said blocks outward and lying at right angles to each other. These blocks are the abutments against which the cutters are clamped.

10 denotes an incline upon the face of each carrier, the purpose of which will presently be explained. In the faces of the carriers contiguous to the inner walls of blocks 9 I place blocks 11, the faces of which are provided with rearwardly-inclined teeth, the fronts of which are straight and are engaged by correspondingly-shaped teeth on the under sides of the cutters, as at 12 in Fig. 10. These blocks are shown as made round and fitting in correspondingly-shaped sockets in the carriers. Beneath the sockets I provide holes 14, so that the blocks may be readily driven out, if required, as clearly indicated in Fig. 10. The cutters are provided on their inner sides—that is, the sides opposite to the sides which engage the walls of blocks 9— with flanges 15, which are adapted to be engaged by flanges 16 upon cutter-locking blocks G. Each carrier carries two cutters, which are locked thereto by a locking-block the overhanging flanges 16 of which engage the flanges 15 upon the cutters. At the rear end of each locking-block is an incline 17, which engages the corresponding incline 10 on one of the carriers. The locking-blocks are secured to the carriers by screws 18, which pass through the locking-blocks and engage the carriers. It will be readily understood from Fig. 11 that when a screw 18 is tightened up the incline 10 upon the carrier, through its engagement with incline 18 upon the locking-block, will throw the latter forward, so that in addition to the engagement of flanges 16 with flanges 15 the cutters will be forced laterally against the walls of blocks 9, thereby locking the cutters against the possibility of movement.

19 denotes pins extending downward from the bottoms of the carriers and engaging openings 20 in the body. (See Fig. 5.) These openings 20 lead into other openings 21 in the body at right angles thereto, in which are plungers 22, forced forward by springs 23, the opposite ends of which engage screw-hubs 24, which close the outer ends of the openings 21. The action of these spring-actuated plungers is to engage the pins 19, extending downward from the carriers, and to throw the carriers, and with them the cutters, to the open position, as in Figs. 1, 2, and 7, it being understood, of course, that the movement of the carriers in opening and closing is an oscillatory movement about stud 2.

The bolt, screw, or rod that is to be threaded is held in any suitable manner, the manner in which the work is held not being of the essence of my present invention. It is likewise not of the essence of my invention whether the work moves toward the tool or the tool moves toward the work, or whether the work is stationary and the tool rotates or the tool is stationary and the work rotates.

25 denotes a hollow mandrel within sleeve D. This mandrel in practice must have reciprocatory movement relatively to the sleeve. The means by which this reciprocatory movement of the mandrel is effected, however, forms no portion of my present invention. So far as my present invention is concerned this movement may be effected by hand or automatically in any suitable manner, as by a cam. At the inner end of mandrel 25 and rigidly secured thereto is a sleeve 26. I have shown the outer end of the sleeve as provided with a threaded opening and the end of the mandrel as threaded to engage said opening. In practice, however, sleeve 26 and mandrel 25 may be made integral, if preferred. Sleeve 26 extends across recess 1 in the body and through a recess 27 in stud 2, as clearly shown in Fig. 3. 28 denotes a groove in the top and sides of sleeve 26, (see Fig. 6,) which receives an inverted-U-shaped wedge 29. I have described this wedge as inverted-U-shaped for the reason that it straddles sleeve 26. The sides of the wedge, however, incline inward from top to bottom, the inclined sides of the wedge engaging inclines 30 on the rear ends of the carrier. The base of wedge 29 is shown as resting upon a plate 31, carried by a plunger 32. This plate is held at the raised position by a spring 33, lying partially in a socket 34 in the body and inclosing the plunger, the action of said spring and plunger being to hold the wedge at a raised position. The wedge is adjusted downward against the power of the spring by a screw 35, which bears upon the top thereof, (see Fig. 3,) the purpose of which will presently be explained.

In use, as already stated, the carriers are normally at the open position, as in Figs. 1 and 2, and are moved to the closed position by the sleeve and wedge, operated in the present instance by the mandrel. The normal or open position of the carriers and cutters and the corresponding position of the wedge is clearly shown in Fig. 2. The inward movement of the sleeve carries the wedge from the position shown in Fig. 2 to the position shown in Fig. 4, thereby moving the carriers and cutters to the closed position. The bolt or other piece of work to be operated upon is then passed in between the cutters, as is clearly shown by dotted lines in Fig. 4, in which a bolt is shown as being threaded. When the thread has been cut the predetermined length upon the piece of work, the sleeve is moved outward again, carrying the wedge from the position shown in Fig. 4 to the position shown in Fig. 2 and permitting springs 23 to throw the carriers and cutters instantly to the open position, as in Figs. 1 and 2, and releasing the piece of work.

In threading bolts, screws, and short rods by hand or otherwise it is sometimes desirable that an adjustable stop be provided which will cause the carriers to be opened at any predetermined time, as when the thread upon a piece of work has been cut the predetermined length. In order to provide a stop of this character, I thread the inner side of sleeve 26 and provide a threaded plug 36, which engages the thread of the sleeve and is adjustable longitudinally relatively to the sleeve. The bearing portion of said plug, which I have indicated by 36$^a$, extends forward into position to be engaged by the end of the piece of work that is being operated upon when the thread has been cut the required length thereon, as will be readily understood from Fig. 4. This stop-plug, however, is not an essential feature of my invention and is only used under certain circumstances. In threading long bolts or rods the stop-plug is of course removed, and the threaded portion of the rod or bolt passes into sleeve 26 and, if necessary, through said sleeve and into mandrel 25.

When the stop-plug is in use, if it is desired to shorten the thread to be cut upon a bolt or screw, plug 36 is turned outward—*i. e.*, toward the cutters. If it is desired to lengthen the thread to be cut upon a bolt or screw, the plug is turned inward, so that the bolt or screw that is being threaded will pass farther in and be acted upon for a greater distance by the cutters before the end of it will engage the plug and force the sleeve and wedge backward and permit springs 23 to throw the carriers to the open position.

Should it be required at any time to thread a smaller bolt or to cut a thread deeper in the bolt or screw, the operator would turn screw 35 inward, which would force the wedge downward, and through the engagement of the wedge with inclines 30 on the carriers would throw the carriers, and with them, of course, the cutters, more or less forward, and would cause the threads of the cutters to engage the bolt or screw more deeply. Should it be required to lessen the depth of the cut or to thread a larger bolt or rod, screw 35 would be turned outward, which would permit spring 33 to lift the wedge up as far as permitted by screw 35 and would permit springs 23 to throw the carriers farther backward, thus permitting a larger bolt or rod to be received between the cutters or cutting a shallower thread therein.

37 denotes oil-passages, which are provided wherever required to permit free escape of oil from the tool and prevent the possibility of clogging.

Having thus described my invention, I claim—

1. In a device of the character described the combination with a body having a circular recess and within said recess a central stud, of cutters and carriers adapted to oscillate about said stud by which the cutters are carried.

2. The combination with a rotatable body having a circular recess, and within said recess a central stud lying at right angles to the axis of the body, of cutters, carriers adapted to oscillate about the stud by which the cutters are carried, means for moving the forward ends of the carriers toward each other to place the cutters in operative position, and springs for returning said carriers to their normal position.

3. The combination with a body having connected openings 20 and 21, of oscillating carriers having pins 19 lying in openings 20 and spring-actuated plungers in openings 21 which engage the pins and act to throw the carriers to the retracted position.

4. The combination with a body having a recess 1 and a central stud 2 therein, of carriers adapted to oscillate about said stud and means for moving the carriers to the operative position.

5. The combination with the carriers having toothed blocks 11, the cutters toothed on the under side to engage said blocks and having flanges 15 and locking-blocks by means of which two cutters are secured to each carrier.

6. The combination with a carrier having blocks 9, toothed blocks 11 and an incline 10, of the cutters having flanges 15, a locking-block having flanges 16 and an incline which engages incline 10 and a screw which passes through the locking-block and engages the carrier, inward movement of the screw causing the cutters to be clamped between the locking-block and blocks 9 and flanges 15 to be clamped between flanges 16 and the carrier.

7. The combination with a body having a circular recess and within said recess a central stud and carriers adapted to oscillate about said stud and provided with inclines 30, of a reciprocating sleeve 26 and an adjustable wedge carried by said sleeve which engages the inclines when the sleeve is moved forward and places the carriers in operative position.

8. The combination with the oscillating carriers, the sleeve and a wedge carried thereby, of a spring for holding the wedge at the raised position and a screw for limiting the upward movement of the wedge.

9. The combination with the oscillating carriers, the sleeve and a wedge carried thereby, of a plate and plunger upon which the wedge rests, a spring for holding the plate and wedge at the raised position and a screw bearing upon the top of the wedge.

10. The combination with a body having a circular recess and within said recess a central stud, of carriers adapted to oscillate about said stud, sleeve 26, U-shaped wedge 29 and means for reciprocating said sleeve and wedge.

11. The combination with a body having a circular recess and within said recess a central stud, cutters and spring-actuated carriers therefor adapted to oscillate about said stud, of reciprocating sleeve 26, a wedge carried thereby by which the carriers and cutters are placed in operative position and a threaded plug engaging the sleeve which when engaged by the end of the piece of work that is being operated upon acts to move the sleeve and wedge backward so that the carriers and cutters will return to the open position.

12. The combination with the body having a recess 1 and a central stud in said recess of spring-actuated oscillating cutter-carriers lying between said stud and the wall of the recess and means as an adjustable wedge for limiting the movement of the carriers.

13. The combination with the body having a recess 1, a stud in said recess itself having a transverse recess 27 and spring-actuated oscillating cutter-carriers lying between said stud and the wall of recess 1, of a reciprocating sleeve 26 engaging the body and recess 27 and an adjustable wedge carried by said sleeve which determines the position of the carriers.

14. The combination with the body having a recess 1, a stud in said recess and spring-actuated oscillating cutter-carriers lying between the stud and the wall of the recess, of a top plate secured to the stud, a reciprocating sleeve and wedge by which the position of the carriers is determined and a screw in the top plate which engages the wedge.

15. The combination with a body having a circular recess and within said recess a central stud, carriers adapted to oscillate about said stud, and means for moving said carriers forward and for determining their backward movement, of thread-cutters and means for rigidly securing said cutters to the carriers.

In testimony whereof I affix my signature in presence of two witnesses.

CHARLES A. JOHNSON.

Witnesses:
W. A. HITCHCOCK,
W. E. GRAHAM.